(12) United States Patent
Shigyo et al.

(10) Patent No.: US 8,430,127 B2
(45) Date of Patent: Apr. 30, 2013

(54) ELECTROHYDRAULIC CONTROL MODULE

(75) Inventors: Toshikazu Shigyo, Bolton (GB);
Yasunori Odakura, Mito (JP); Itaru Tanabe, Naka (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 324 days.

(21) Appl. No.: 12/739,055

(22) PCT Filed: Jul. 23, 2009

(86) PCT No.: PCT/JP2009/063211
§ 371 (c)(1),
(2), (4) Date: Jun. 17, 2010

(87) PCT Pub. No.: WO2010/024069
PCT Pub. Date: Mar. 4, 2010

(65) Prior Publication Data
US 2010/0288950 A1 Nov. 18, 2010

(30) Foreign Application Priority Data
Aug. 29, 2008 (JP) .................................. 2008-221730

(51) Int. Cl.
*F15B 13/043* (2006.01)
(52) U.S. Cl.
USPC ............. 137/625.64; 251/129.01; 251/129.15
(58) Field of Classification Search ............. 251/129.01, 251/129.15; 137/625.64, 625.65
See application file for complete search history.

(56) References Cited

U.S. PATENT DOCUMENTS

| 5,940,271 | A | * | 8/1999 | Mertol | 361/704 |
| 6,104,618 | A | | 8/2000 | Loibl | |
| 6,160,708 | A | * | 12/2000 | Loibl et al. | 361/704 |
| 6,180,880 | B1 | | 1/2001 | Loibl et al. | |
| 7,070,161 | B2 | * | 7/2006 | Piehl et al. | 251/65 |
| 7,151,674 | B2 | * | 12/2006 | Sasaki et al. | 361/752 |

(Continued)

FOREIGN PATENT DOCUMENTS

| DE | 10 2006 039 949 A1 | 2/2008 |
| EP | 0 541 307 A1 | 5/1993 |

(Continued)

OTHER PUBLICATIONS

International Search Reported with English translation dated Oct. 13, 2009 (Five (5) pages).

(Continued)

*Primary Examiner* — John K Fristoe, Jr.
*Assistant Examiner* — Umashankar Venkatesan
(74) *Attorney, Agent, or Firm* — Crowell & Moring LLP (57) ABSTRACT

Disclosed is an electrohydraulic control module capable of being reduced in the number of components. A control valve 6 includes a concave portion 51 that serves as an oil pathway. An electronic control device 4 controls a solenoid 33 and the like. An electrical interconnect plate 2 includes an interconnect member 21 such as a bus bar. A separate plate 5 is disposed between the interconnect plate 2 and the control valve 6. The interconnect plate 2 also includes a concave portion 24 at its surface side that abuts the separate plate 5, the concave portion 24 being formed at a position corresponding to a concave portion 63 of the control valve 6. The separate plate 5 includes a communication portion 51 that communicates between the concave portion 63 of the control valve 6 and the concave portion 24 of the interconnect plate 2.

3 Claims, 5 Drawing Sheets

U.S. PATENT DOCUMENTS

| | | | |
|---|---|---|---|
| 7,375,966 B2 * | 5/2008 | Murakami et al. | 361/707 |
| 7,656,674 B2 * | 2/2010 | Wetzel et al. | 361/752 |
| 2004/0035245 A1 * | 2/2004 | Albert et al. | 74/606 A |
| 2005/0219817 A1 * | 10/2005 | Suzuki et al. | 361/699 |

FOREIGN PATENT DOCUMENTS

| | | |
|---|---|---|
| EP | 1 239 710 A2 | 9/2002 |
| JP | 5-203078 A | 8/1993 |
| JP | 11-63219 A | 3/1999 |
| JP | 11-311352 A | 11/1999 |
| JP | 2000-193123 A | 7/2000 |
| JP | 2003-318568 A | 11/2003 |
| JP | 2004-28185 A | 1/2004 |
| JP | 2004-150466 A | 5/2004 |
| JP | 2005-282715 A | 10/2005 |
| JP | 2006-86296 A | 3/2006 |
| JP | 2007-232185 A | 9/2007 |
| JP | 2009-162382 A | 7/2009 |

OTHER PUBLICATIONS

Form PCT/IB/338 and Form PCT/IB/373 (Notification of Transmittal of Translation of the International Preliminary Report on Patentability) dated Apr. 21, 2011 (two (2) pages).

English translation of Form PCT/ISA/237 (five (5) pages).

European Search Report dated May 14, 2012 (nine (9) pages).

* cited by examiner

ELECTROHYDRAULIC CONTROL MODULE

TECHNICAL FIELD

The present invention relates generally to electrohydraulic control modules for control of automotive-use power transmissions, and more particularly, to an electrohydraulic control module suitable for installation in a transmission case.

BACKGROUND ART

In known electrohydraulic control modules, a control valve and an electronic control unit or an electrical interconnect plate including an electronic control unit are constructed independently, the interconnect plate or the electronic control unit being mounted on an upper section or lower section of the control valve. These conventional modules are described in Patent Documents 1, 2, and 3, for example.

RELATED-ART DOCUMENTS (Patent Documents)
Patent Document 1: JP-2004-150466-A
Patent Document 2: JP-2004-28185-A
Patent Document 3: JP-2007-232185-A

SUMMARY OF THE INVENTION

Problems to be Solved by the Invention

The modules described in Patent Documents 1, 2 and 3, however, have a problem in that each module requires a large number of components. That is to say, in addition to an upper control valve and lower control valve, each having an oil pathway formed therein, the control valve includes a separate plate disposed between both control valves to ensure oil tightness, and various electrical components such as solenoids. In addition, the interconnect plate includes an interconnect member such as a bus bar, an electronic control device connected to the interconnect member, the electrical components, such as a sensor and a switch, that are connected to the interconnect member, and a cover member and base member fixed to upper and lower sections, respectively, of the interconnect plate in order to prevent terminal-to-terminal short-circuiting in the electronic control device. As a result, the number of components in the conventional electrohydraulic control modules has increased.

Furthermore, in addition to having the cover member and base member fixed to the upper and lower sections of the interconnect plate in order to prevent terminal-to-terminal short-circuiting of the electronic control device, each conventional electrohydraulic control module has had its interconnect plate and its cover member formed into a labyrinth structure to prevent terminal-to-terminal short-circuiting. Briefly, the electronic control device has required an oiltight structure that protects the unit from likely corrosion due to exposure to a high-temperature fluid environment.

A first object of the present invention is to provide an electrohydraulic control module capable of being reduced in the number of components.

A second object of the invention is to provide an electrohydraulic control module capable of eliminating the need of a special oiltight structure for protecting an electronic control device.

Means for Solving the Problems (1) In order to achieve the above first object, according to an aspect of the present invention is an electrohydraulic control module comprising:

a control valve for hydraulically controlling a transmission, the control valve being provided with an oil pathway including a concave portion;

an electronic control device that controls a component to be controlled by the control valve; and an electrical interconnect plate including an interconnect member, the interconnect member electrically connecting the electronic control device and the component to be controlled;

wherein the electrohydraulic control module includes a separate plate disposed between the interconnect plate and the control valve;

the interconnect plate includes a concave portion on its surface side that abuts the separate plate, the concave portion being formed at a position corresponding to the concave portion of the control valve; and the separate plate includes a communication portion that communicates between the concave portion of the control valve and the concave portion of the interconnect plate. With this module configuration, the module reduces the number of components.

(2) In item (1) outlined above, the electronic control device is preferably embedded in the interconnect plate.

(3) In item (1), the interconnect plate is preferably formed by insert-molding a bus bar with a resin.

(4) In item (1), preferably the module further comprises a metallic component that is insert-molded in the concave portion of the interconnect plate.

(5) In item (4) outlined above, the metallic component preferably is of a concave-shaped type.

(6) In order to achieve the foregoing second object, according to another aspect of the present invention is an electrohydraulic control module comprising:

a control valve for hydraulically controlling a transmission, the control valve being provided with an oil pathway including a concave portion;

an electronic control device that controls a component to be controlled by the control valve; and an electrical interconnect plate including an interconnect member, the interconnect member electrically connecting the electronic control device and the component to be controlled;

wherein the electrohydraulic control module includes a separate plate disposed between the interconnect plate and the control valve;

the interconnect plate includes a concave portion at a part of its surface side that abuts the separate plate; and the electronic control device is mounted in the concave portion of the interconnect plate. With this module configuration, the module can dispense with a special oiltight structure for protecting the electronic control device.

(7) In item (6) outlined above, preferably the module further comprises a metallic component that is insert-molded in the concave portion of the interconnect plate.

(8) In item (6), preferably, the control valve includes a convex portion formed on its surface side that abuts the separate plate, the convex portion being higher than the surface that abuts the separate plate; the separate plate includes a hole free from interference with the convex portion; and the convex portion of the control valve extends through the hole in the separate plate and comes into contact with part of the electronic control device.

(9) In item (6), the concave portion of the interconnect plate is provided in a plurality of places; and a circuit block for the electronic control device is divided into segments such that circuit elements of the circuit block are distributedly arranged in the concave portions.

EFFECTS OF THE INVENTION

According to the present invention, the number of components in an electrohydraulic control module is reduced.

In addition, the present invention provides, an electrohydraulic control module is formed that dispenses with a special oiltight structure for protecting an electronic control device.

BEST MODE FOR CARRYING OUT THE INVENTION

Hereunder, a configuration of an electrohydraulic control module according to a first embodiment of the present invention will be described using FIGS. 1 to 4.

Figure 1:
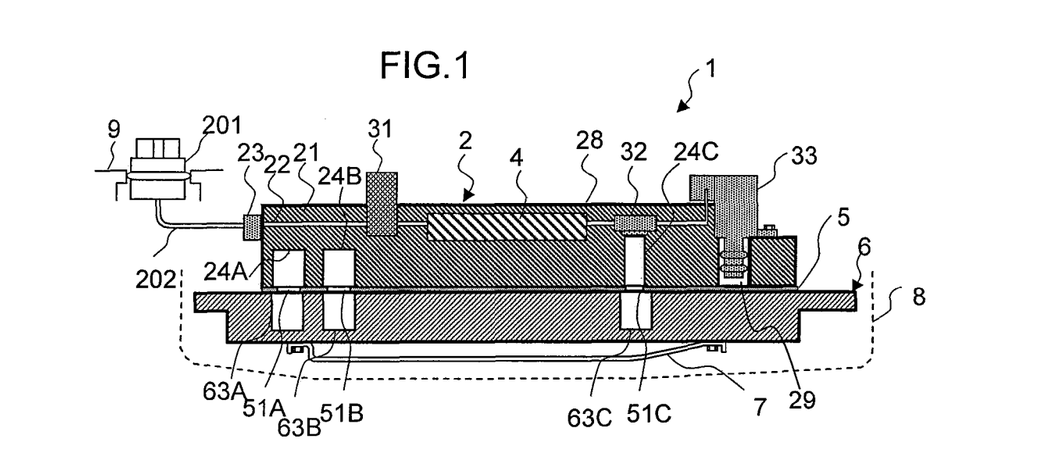
FIG. 1 is an essential-portion sectional view illustrating a configuration of an electrohydraulic control module according to a first embodiment of the present invention.
Figure 2:
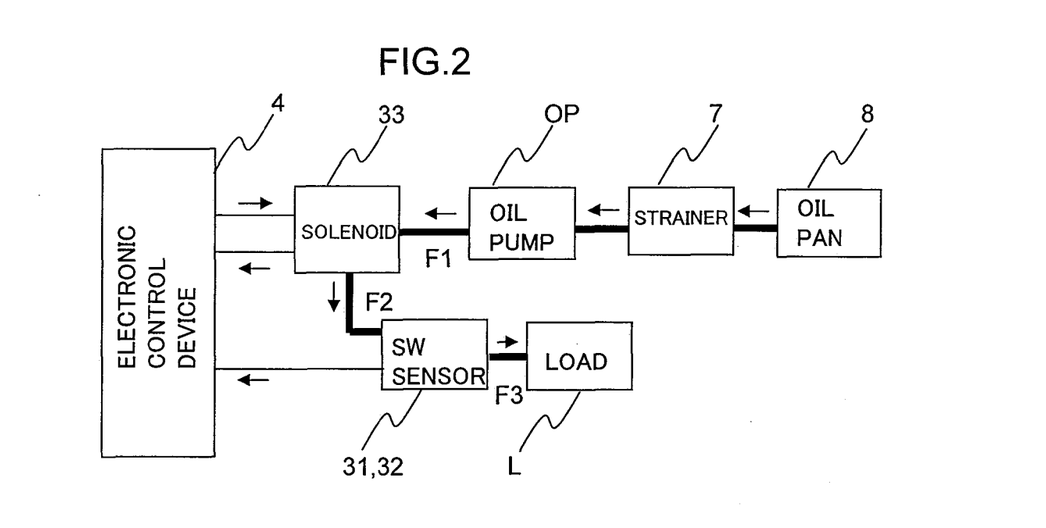
FIG. 2 is a circuit diagram of a hydraulic circuit including a control valve used in the electrohydraulic control module according to the first embodiment of the present invention.
Figure 3:
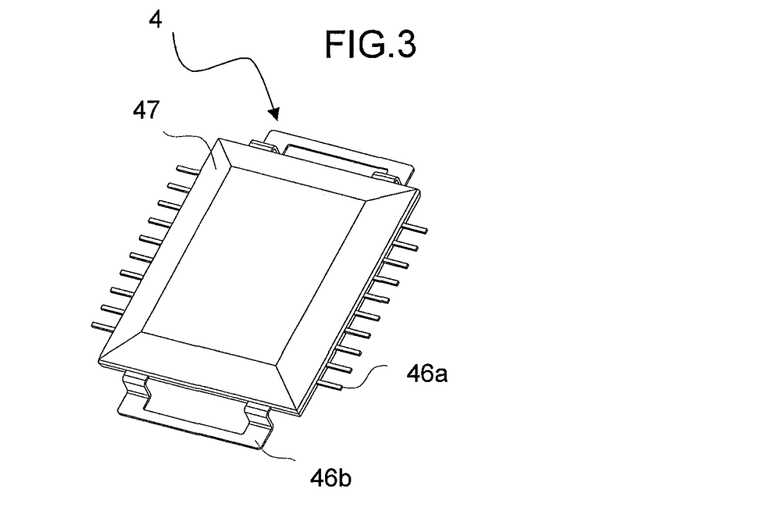
FIG. 3 is a perspective view illustrating a configuration of an electronic control device used in the electrohydraulic control module according to the first embodiment of the present invention.
Figure 4:
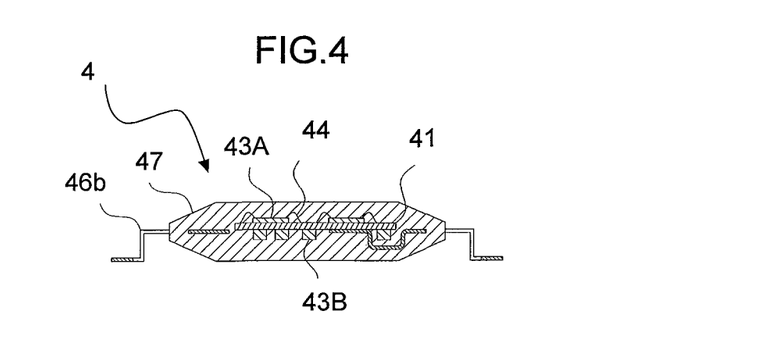
FIG. 4 is an essential-portion sectional view illustrating the configuration of the electronic control device used in the electrohydraulic control module according to the first embodiment of the present invention.

FIG. 1 is an essential-portion sectional view illustrating the configuration of the electrohydraulic control module according to the first embodiment of the present invention. FIG. 2 is a circuit diagram of a hydraulic circuit including a control valve used in the electrohydraulic control module according to the first embodiment of the present invention. FIG. 3 is a perspective view illustrating a configuration of an electronic control device used in the electrohydraulic control module according to the first embodiment of the present invention. FIG. 4 is an essential-portion sectional view illustrating the configuration of the electronic control device used in the electrohydraulic control module according to the first embodiment of the present invention.

First, a total module configuration of the electrohydraulic control module according to the present embodiment is described below using FIG. 1.

The electrohydraulic control module 1 according to the present embodiment is constituted primarily by an electrical interconnect plate 2, a lower control valve 6, and a separate plate 5.

The interconnect plate 2 is formed by insert-molding a plurality of interconnect members 22, electrical components such as a sensor 31 and a switch 32, an electronic control device 4, and a connector 23, with a resin 21. The resin 21 is a thermoplastic resin having an electrical insulating property. The resin 21 provides insulation between the plurality of interconnect members 22 and between a plurality of terminals of the electronic control device 4.

Each interconnect member 22 includes a bus bar of highly heat-conductive copper or of a copper-based alloy material. A wire harness, a cable, a wiring substrate, or the like can be used as the interconnect member 22. However, a bus bar easy to insert-mold with a thermoplastic resin is preferred.

In addition to the sensor 31, the switch 32, a solenoid 33, and other electrical components to be controlled, the electronic control device 4 and the connector 23 are electrically connected to the interconnect member 22 by welding. A connecting method alternative to welding can be, for example, using connectors, pressure bonding, brazing, or the like. In the example of FIG. 1, the sensor 31 and the switch 32 are embedded in the resin 21, but may be mounted on the resin 21.

The sensor 31, the switch 32, the solenoid 33, and the like are electrical components that are to be controlled. The sensor 31 includes, for example, a speed sensor that measures rotary bodies of an input shaft and output shaft located inside a transmission, an oil temperature sensor that measures a temperature of a fluid, an oil pressure sensor that measures a pressure of the fluid, and an inclination angle sensor that measures an angle of inclination. The switch 32 includes, for example, an oil pressure switch that measures the pressure of the fluid, and a range switch that measures range signal levels of the transmission. The solenoid 33 controls a flow rate of the fluid by opening/closing a valve to control selection of a speed range.

The resin 21 has a through-hole 29 formed therein. The solenoid 33 is mounted on the resin 21, and a movable section of the solenoid is inserted in the through-hole 29. The through-hole 29 is used as an oil pathway. The solenoid 33 is used for opening/closing the oil pathway. The solenoid 33 has a body fixed to the resin 21 via a screw or the like. The body of the solenoid 33 may be fixed to be resin 21 so as to be embedded therein. Also, the solenoid 33 can be provided at the side of the lower control valve 6. In that case, electrical connection will be via a connector. As described above, the solenoid 33 can be disposed at the side of either the interconnect plate 2 or the lower control valve 6. The solenoid 33 can be disposed in a longitudinal direction or a lateral direction. In the illustrated example, the solenoid 33 is disposed in the longitudinal direction with respect to the interconnect plate 2.

The connector 23 is connected to an external connector 201 that connects to an external element, via a connecting member 202. A bus bar is used as the connecting member 202. The connecting member 202 can be a wire harness, a wiring substrate, or the like. Additionally, the connecting member 202 may be removed and the external connector 201 connected directly to and formed integrally with the interconnect plate 2. Furthermore, if optimal layout of electrical components such as the sensor 31 and switch 32 is impossible, connectors of the electrical components and the connector 201 may be electrically interconnected via connecting members.

The external connector 201 has a front clearance and is electrically connected to a transmission case 9. The external connector 201 has an O-ring or the like to implement airtight and oiltight sealing between the connector 201 and the transmission case 9.

At a part of a surface side of the resin 21, which abuts the separate plate 5, the interconnect plate 2 includes concave portions 24A, 24B and 24C that serve as an oil pathway for oil pressure control. The oil pathway is a groove for supplying the transmission fluid. The surface of the resin 21, which abuts the separate plate 5 has sufficient planarity to ensure oil tightness.

The lower control valve 6 is used to control the oil pressure of the transmission. Concave portions 63A, 63B, and 63C through which to admit the fluid for controlling the oil pressure are formed in the lower control valve 6. The concave portions 63A, 63B, 63C have an oil pathway function. The lower control valve 6 is molded by aluminum diecasting with an aluminum material. The lower control valve 6 may be formed from other metallic materials or from a resin material. The lower control valve 6, as its name implies, is disposed under or below the interconnect plate 2, as illustrated in FIG. 1. For a structure that permits disposition above the interconnect plate 2, however, the control valve 6 will be termed an "upper control valve."

Each of the concave portions 63A, 63B, and 63C of the lower control valve 6 are provided at positions directly below the concave portions 24A, 24B and 24C, respectively, of the interconnect plate 2.

Between the interconnect plate 2 and the lower control valve 6, the separate plate 5 is sandwiched. The separate plate 5 has an oiltight sealing function to prevent the fluid in the oil pathway of the lower control valve 6 from leaking. Briefly, components in contact with the separate plate 5 are kept oiltight on the contact surface.

Provided that oil tightness in a longitudinal direction of the separate plate 5 is ensured, the separate plate 5 may be made of a metallic material or a resilient body, and single-sheet construction is preferred. The present example assumes iron as the plate material. Plate thickness of the separate plate 5 is not defined, but the plate preferably has a certain strength level to avoid deformation when sandwiched. In addition, the surfaces of the separate plate 5, which abut the interconnect plate 2 and the lower control valve 6 have sufficient planarity to ensure oil tightness against the fluid.

The separate plate 5 includes communication portions 51A, 51B, and 51C each of which communicate between the corresponding oil pathway formed by: the concave portion 24A of the interconnect plate 2 and the concave portion 63A of the lower control valve 6; 24B and 63B; and 24C and 63C. The communication portions 51A, 51B, 51C can be circular or rectangular in shape, and each needs only to make the respective oil pathways extend through or obliquely communicate between the oil pathways.

The resin 21 can be of the smallest thickness achievable for insert-molding interconnect members. Instead, the resin can have a thickness as constant as possible so as to make the concave portions 24 moldable for use as the oil pathways, and so as to allow the electronic control device and other electrical components to be embedded in the concave portions 24.

A sensor section of the switch 32 such as an oil pressure switch faces the concave portion 24C of the plurality of concave portions provided in the interconnect plate 2. Thus, the oil pressure, and the like, of the fluid flowing through the oil pathway formed by the concave portion 24C can be detected.

In addition, in regard to the plurality of concave portions provided in the interconnect plate 2, concave portions for use as dummy oil pathways can be provided.

Since the resin 21 is insert-molded, moldability can be improved by providing the concave portions for dummy oil pathway use.

The hydraulic circuit including the control valve used in the electrohydraulic control module according to the present embodiment is described below using FIG. 2. The same reference numerals or symbols as those used in FIG. 1 denote the same sections. In FIG. 2, a thick solid line signifies an oil pathway and a thin solid line signifies a signal line.

An oil pump OP pumps up a fluid from an oil pan 8 via a strainer 7. The fluid, after being boosted in pressure by the oil pump OP, is supplied to the solenoid 33 through an oil pathway F1 in the control valve. The solenoid 33 is opened/closed in accordance with a control signal from the electronic control device 4, and thus controls an oil pressure of the fluid. The oil pressure that has been controlled by the solenoid 33 is supplied to the oil pressure switch SW31 and the oil pressure sensor 32 through an oil pathway F2 of the control valve. The oil pressure, after being detected by the switch SW31, the sensor 32, and the like, is acquired into the electronic control device 4. The electronic control device 4 then controls the solenoid 33 so that the detected oil pressure matches a predetermined level. The fluid that has been controlled to the predetermined pressure level is supplied to a load L such as an actuator, through an oil pathway F3 of the control valve, thereby to operate the load L.

In this case, each of the oil pathway F1 and F2, for example, is equivalent to the oil pathway formed by the through-hole 29 of FIG. 1, and each of the oil pathway F2 and F3 is equivalent to the oil pathway formed by the concave portions 24C and 63C of FIG. 1. The concave portions 24A and 63A, and 24B and 63B shown in FIG. 1 also constitute predetermined oil pathways.

As described above, each of the concave portions 63A, 63B, and 63C of the lower control valve 6 and each of the corresponding concave portions 24A, 24B, and 24C of the interconnect plate 2 constitute oil pathways in the present embodiment.

Traditionally, a lower control valve 6, an upper control valve, and a separate plate 5 have constituted a control valve. The upper control valve here, as with the lower control valve 6, is aluminum-diecast, having concave portions that are surface-symmetrical with respect to the lower control valve 6. The separate plate 5 is sandwiched between the lower control valve 6 and the upper control valve, thereby constituting a control valve oil pathway.

In contrast to this, in the present embodiment, the concave portions 24A, 24B, and 24C are formed in the interconnect plate 2, and each of these concave portions, 24A, 24B, and 24C, and the corresponding concave portions 63A, 63B, and 63C of the lower control valve 6 constitute oil pathways. Accordingly, one of the control valve components (i.e., the upper control valve in the foregoing example) can be omitted for a reduced number of components.

Next, the configuration of the electronic control device used in the electrohydraulic control module according to the present embodiment will be described using FIGS. 3 and 4.

As shown in FIG. 3, the electronic control device 4 is sealed with a sealing resin 47, and has a lead member that includes lead terminals 46a and flanges 46b, the lead member protruding outward from the electronic control device 4. Also as shown in FIG. 4, the electronic control device 4 is constructed with electronic components 43A and 43B, a multilayered wiring substrate 41, the lead member, and the sealing resin 47, as major members of the control unit 4.

The electronic control device 4 is of the following construction. That is to say, the multilayered wiring substrate with the electronic components 43A and 43B mounted thereon is bonded onto the lead member inclusive of the lead terminals 46a and the flanges 46b, via an adhesive agent, the multilayered wiring substrate and the lead terminals are electrically interconnected, and the control unit 4 is covered with the sealing resin 47 so as to expose portions of both the lead terminals 46a and the flanges 46b.

The electronic control device 4 has a circuit block for receiving input signals from the sensor 31 and the switch 32 and controlling the solenoid 33 that is one of the components to be controlled, and a circuit block that electrically communicates with an external control unit.

Electronic components are mounted on both upper and lower surfaces, or one of the upper and lower surfaces, of the multilayered wiring substrate 41 mixedly with a chip component 43A and a package component 43B. The chip component 43A that is a bare-chip CPU, an electric power IC, or the like, is secured to the multilayered wiring substrate 41 via solder or an electrically conductive adhesive. Electrical connection between an electrode section of the chip component 43A and the multilayered wiring substrate 41 uses a thin wire 44. The connection using the thin wire 44 may be substituted by flip-chip connection that uses a solder ball, a bump made of gold, an electroconductive adhesive agent, or the like.

The package components 43B are, for example, resistors, capacitors, and diodes, and are secured to the multilayered wiring substrate 41 via solder. Alternatively, the package components 43B are fixable using an electroconductive adhesive. The electronic control device 4, in particular, that controls the transmission and the like is formed on such a circuit of a relatively large scale that includes more than 100 electronic components (chip components 43A and package components 43B), the control unit 4 being dimensionally different from semiconductor devices or integrated circuit devices of a relatively small size or of a relatively small circuit size. Conventional semiconductor devices and the like measure about 10 mm square in substrate size and about 3 mm in height, whereas the electronic control device 4 in the present embodiment is larger than these conventional semiconductor devices, measuring about 30 mm square in substrate size and about 8 mm in height. Therefore, conventional semiconductor devices with a heat sink allow absorption of warpage due to differences in linear expansion coefficient between dissimilar materials, whereas such warpage is significantly influential in the present embodiment.

The multilayered wiring substrate 41 is, for example, a glass epoxy substrate that uses a material formed by combining glass fibers and an epoxy resin. Use of the glass epoxy substrate allows both-side mounting, multilayered wiring, and hence, cost reduction. Alternatively, the multilayered wiring substrate 41 can be, for example, a ceramic substrate based on alumina or the like, a flexible substrate based on polyimide or the like, or a metal core substrate that uses a metal core layer.

The multilayered wiring substrate 41 is of a multilayered through structure for achieving interlayer through-hole circuit connection, or a multilayered IVH (Interstitial Via Hole) structure for achieving interlayer IVH circuit connection. The substrate 41 employs about four to eight layers, thus ensuring appropriate mounting efficiency and cost reduction. For example, a build-up multilayered structure molded using a build-up process can be used as an alternative. It is preferable that plate thickness be as small as reasonably achievable. Heat from the electronic components 43 will then be more rapidly releasable to members whose heat conductivity is higher than that of the components 43.

The lead member including the lead terminals 46a and the flanges 46b is suitably formed from highly heat-conductive copper or a highly heat-conductive alloy material that contains copper. Each flange 46b serves as a fixing element for connection to an external device, and as a path for heat conduction.

The lead terminals 46a can each be either a terminal formed by separating a portion of the lead member, or a member different therefrom. The lead terminals 46a can be exposed in any of four directions. In the example of FIG. 3, however, the lead terminals 46a are exposed in two lateral directions reverse to each other, to make the interconnect plate 2 and the electronic control device 4 as thin as reasonably achievable. While twenty lead terminals 46a are provided at both sides as shown in FIG. 3, this number can be increased or reduced, depending upon system requirements.

Any type of adhesive agent can be used, if it allows the multilayered wiring substrate 41 and the lead member to be secured. However, a thermosetting resin composition such as an epoxy resin or acrylic resin is suitable in terms of heat conductivity, stress relaxation, and working efficiency. Concurrent bonding with reflow processing of the electronic components 43 is likewise possible by using solder or an electroconductive adhesive agent. For bonding with an adhesive agent, the lead member 46 is coated with the adhesive, then the multilayered wiring substrate 41 is mounted at a predetermined position, and heat is applied to cure the adhesive. There is formed a route through which the heat emitted from the electronic components 43 will be released to the flanges 46b of the lead member that are higher than the components 43 in heat conductivity.

After the bonding, the multilayered wiring substrate 41 and the lead terminals 46b are electrically interconnected via the thin wires 44 by thermal compression bonding, wire bonding, or the like. The thin wires 44 can be of an aluminum, gold, or copper material. The surface section for connecting the thin wires 44 by wire bonding is partially plated with nickel, silver, or the like, to prevent the surface from being oxidized.

The sealing resin 47 is manufactured by transfer molding. For transfer molding, a thermosetting resin such as an epoxy resin is typically used as the sealing resin 47. In particular, a resin with a small linear expansion coefficient is used as the sealing resin 47, and the resin totally enfolds internal components. In addition, optimum physical characteristics data is selected for the sealing resin 47 to always maintain adhesion to the internal components or to prevent the thin-wire bonding connections (and the like) between soldered sections or chip components and the multilayered wiring substrate 41 from becoming peeled or disconnected by thermal stressing.

In the electronic control device 4 for the transmission, repeated thermal stressing during operation of the control unit is likely to result in an ingress of water, an oil, or the like, from adhesion interfaces between the sealing resin 47 and the lead terminals 46a or flanges 46b of the lead member that are exposed from the sealing resin 47. For this reason, a difference in linear expansion coefficient between the lead member and the sealing resin 47 is minimized and additionally, exposure cross-sectional areas of the flanges 46b and the lead terminals 46a are reduced, whereby thermal stresses between the lead member and the sealing resin 47 are reduced. Furthermore, the lead member is subjected to surface treatment such as roughening, and thus covalently bonded with the sealing resin 47 at the interfacial section between both. For example, in a single-side molded structure using a heat sink, since the transmission-use electronic control device 4 of a large circuit scale and a relatively large overall size correspondingly increases in both exposure cross-sectional area and interfacial area, thermal stresses due to the differences in linear expansion coefficient between dissimilar materials can cause warping, peeling-off, and/or cracking, and consequently deteriorate air tightness and oil tightness. These problems, however, can be solved by adopting transfer molding.

An assembly process relating to the electrohydraulic control module of the present embodiment is next described below using FIG. 1.

First, the interconnect plate 2 on which various electrical components and the electronic control device 4 are mounted thereon, and the control valve 6 are disposed so as to sandwich the separate plate 5. Next, the interconnect plate 2 and the control valve 6 are fixed using several bolts. This forms a control valve assembly. The oil strainer 7 for removing dirt and the like from the transmission fluid is fixed to the lower control valve 6 of the control valve assembly via screws, as shown in FIG. 1. The control valve assembly that has thus been formed is fixed to the inside of the oil pan 8 in the transmission case 9 via several bolts. Connection of the transmission case 9 to the external connector 201 can either precede or follow the fixing of the control valve assembly to the transmission case 9.

Conventional module assembly processes have required a large number of steps because of the lower control valve, the separate plate, and the upper control valve being assembled into the form of the control valve before the interconnect plate is mounted.

In contrast to the above sequence, the present embodiment reduces the number of steps since only the interconnect plate and the lower control valve require assembly.

In addition, the interconnect plates of the conventional electrohydraulic control modules have been constructed as follows:

A rectangular through-hole that enables installation of an electronic control device is formed in an insert-molded resin material of an interconnect member. The interconnect member has one end exposed to an inner surface of the through-hole. The electronic control device is installed in the through-hole, and lead terminals of the electronic control device are connected to the interconnect member. In order to prevent electroconductive foreign substances from entering the interconnect member and the lead terminals of the electronic control device, a base member is disposed at a lower section of the through-hole and a cover member is disposed at an upper section of the through-hole, with a labyrinth structure being provided on the base member and the cover member each. Therefore, the cover member and the base member are necessary and the number of components correspondingly increases. In addition, since the cover member and the base member require disposition, the number of steps correspondingly increases.

In the present embodiment, however, the electronic control device, together with the interconnect member, is insert-molded in the interconnect plate, the cover member and the base member are unnecessary, which reduces the number of components required, and hence, the number of steps required.

Additionally, the electrohydraulic control module is reduced in weight since the oil pathways 24A, 24B, 24C are provided in the interconnect plate insert-molded with a resin of lower specific weight than aluminum.

The electronic control device is embedded in the interconnect plate, so that the electronic control device can be mounted without being restricted by layout of the transmission case internal structural components or that of various electrical components.

The effects of the electrohydraulic control module according to the present embodiment are summarized below.

Firstly, for the control valve that is usually aluminum-diecast and includes two components or more in divided form, the upper control valve is made unnecessary, and the number of components is reduced, by providing the oil pathways in the interconnect plate and arranging the interconnect plate and the lower control valve so as to sandwich the separate plate.

Secondly, because of the electronic control device being embedded in the interconnect plate with the interconnect member resin-inserted therein, the need of the cover member and base member for preventing entry of electroconductive foreign substances is eliminated and the number of components required is reduced.

Thirdly, including the oil pathways in the interconnect plate reduces the number of steps since the interconnect plate that has traditionally been assembled independently of the control valve can be assembled simultaneously therewith.

Fourthly, including the oil pathways in the interconnect plate that is insert-molded with a resin of lower specific weight than aluminum reduces the electrohydraulic control module in weight.

Fifthly, since the fluid for oil pressure control is made oiltight by the separate plate, providing a concave portion in the interconnect plate partially on its surface side that abuts the separate plate, and then mounting the electronic control device in the concave section helps avoid overprotecting the electronic components and substrate that are likely to corrode under a hot fluid environment.

Sixthly, short-circuiting between terminals is prevented since the bus bar of the interconnect plate is insert-molded with a resin. Short-circuiting between the terminals of the electronic control device is prevented more reliably since the electronic control device is embedded in the interconnect plate.

Seventhly, an advantage in that the embedding of the electronic control device in the interconnect plate renders the electronic control device mountable without being restricted by the internal structure of the transmission case or the layout of electrical components is yielded as a layout restrictions reduction effect. Additionally, even if the electronic control device is too large for the module to be able to afford a concave portion of an appropriate mounting size for the electronic control device, a mounting area therefor can be created by providing a plurality of concave portions in the interconnect plate, dividing a circuit block of the electronic control device into segments, and distributedly arranging these segments of the circuit block in the concave portions.

Eighthly, a heat release effect is yielded. More specifically, the control valve includes a convex portion higher than its surface that abuts the separate plate, and a hole free from interference with the convex portion is provided in the separate plate. Therefore, heat from the electronic control device is directly released, without a plate-like base member being used midway, to the aluminum-diecast control valve of higher heat conductivity. The release of the heat can be accomplished by first forming, in the interconnect plate, a concave portion partially on its surface side that abuts the separate plate, and then abutting upon the convex portion the electronic control device existing after being mounted in the concave portion.

Next, a configuration of an electrohydraulic control module according to a second embodiment of the present invention will be described using FIG. 5.

Figure 5:
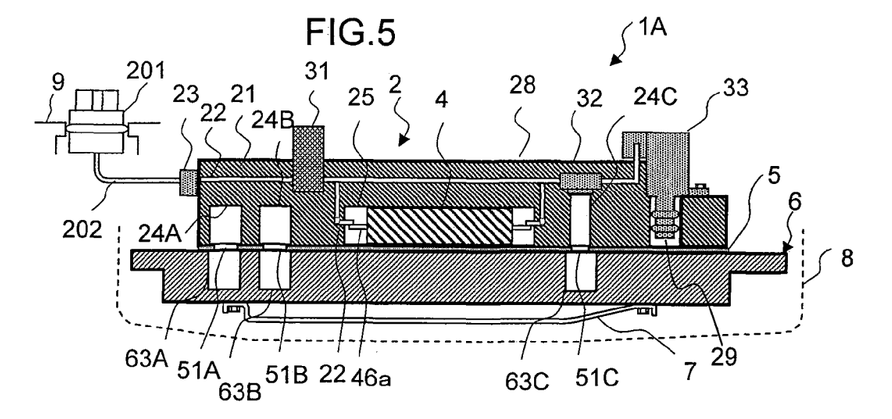
FIG. 5 is an essential-portion sectional view illustrating a configuration of an electrohydraulic control module according to a second embodiment of the present invention.

FIG. 5 is an essential-portion sectional view illustrating the configuration of the electrohydraulic control module according to the second embodiment of the present invention. In FIG. 5, the same reference numerals or symbols as those used in FIG. 1 denote the same sections.

The electrohydraulic control module 1A according to the present embodiment differs from the electrohydraulic control module 1 of FIG. 1 in terms of both a mounting position of an electronic control device 4 embedded in an interconnect plate 2A, and a shape of the interconnect plate 2A. Other constituent components are the same.

In the present embodiment, the interconnect plate 2A includes a concave portion 25 in a part of its surface side that abuts a separate plate 5. The electronic control device 4 is mounted in the concave portion 25. The concave portion 25 is of a volume appropriate for mounting dimensions of the electronic control device 4, the concave portion 25 suitably being of a rectangular shape. That is to say, the concave portion 25 dimensionally differs from the concave portions 24 for use as oil pathways. Interconnect members 22 each molded with a resin 21 are formed in exposed form in sidewalls of the concave portion 25. The exposed portions of the interconnect members 22 are electrically connected to a lead member 46 of the electronic control device 4 by welding. A connecting method alternative to welding can be brazing, pressure welding, press-fitting, or the like. The interconnect plate 2A or a lower control valve 6 and the separate plate 5 prevent entry of a fluid, electroconductive foreign substances, and the like, eliminating a need to provide an electrical insulating wall between lead terminals 46a of the lead member.

The present embodiment yields the following effects in addition to those of the first embodiment shown and described in FIG. 1. That is to say, the interconnect plate includes a concave portion provided in a part of its surface side that abuts the separate plate, and the concave portion is kept oiltight by the separate plate against the fluid for hydraulic control. Mounting the electronic control device in the concave portion prevents entry of the fluid and electroconductive foreign substances, and hence, short-circuiting between the terminals.

Additionally, the electronic control device can be mounted at a position away from the oil pathways in the interconnect plate and the control valve, without being restricted by the layout of the transmission case internal structural components and that of electrical components.

Next, a configuration of an electrohydraulic control module according to a third embodiment of the present invention will be described using FIG. 6.

Figure 6:
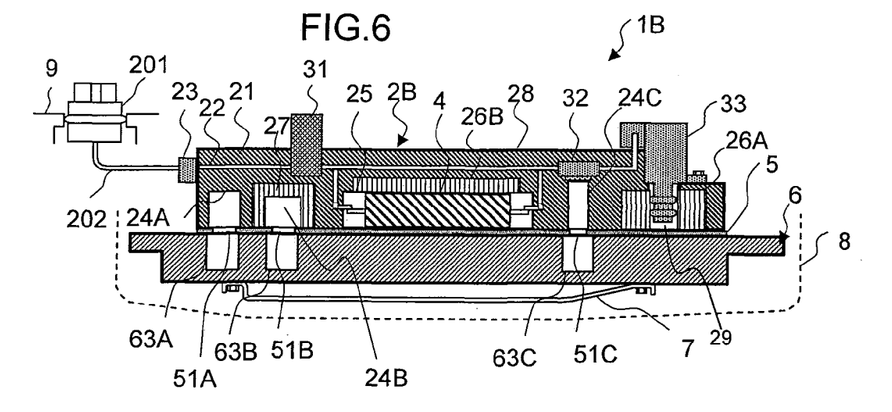
FIG. 6 is an essential-portion sectional view illustrating a configuration of an electrohydraulic control module according to a third embodiment of the present invention.

FIG. 6 is an essential-portion sectional view illustrating the configuration of the electrohydraulic control module according to the third embodiment of the present invention. In FIG. 6, the same reference numerals or symbols as those used in FIG. 1 denote the same sections.

The electrohydraulic control module 1B according to the present embodiment differs from the electrohydraulic control module 1 of FIG. 1 in that an interconnect plate 2B includes a concave metallic component 27 inserted in a concave portion 24B thereof, at the surface side that abuts a separate plate 5. The concave metallic component 27 is used to reinforce a resin 21 by imparting durability against a high fluid pressure to the resin 21. The concave metallic component 27 has its dimensions and shape determined by a shape of an oil pathway in the concave portion 24B and a degree of the reinforcement. A specific pressure of the fluid through a flow pathway may eliminate a need to dispose a concave metallic component, as in a concave portion 24A.

In order to reinforce an oil pathway in a solenoid 33, the interconnect plate 2B also includes a ring-shaped metallic component 26A inserted in a location of the solenoid 33, at the side facing the separate plate 5.

The interconnect plate 2B additionally includes a rectangularly parallelepiped metallic component 26B inserted at the side that a concave portion 25 faces the separate plate 5. The metallic component 26B has a plurality of threads. Using the flanges 46b of the electronic control device 4 shown in FIG. 3 allows the electronic control device 4 to be fixed via a plurality of screws.

Furthermore, the interconnect plate 2B molded with the resin 21 can be prevented from warping, by inserting the metallic component 26B into a thick section or central section of the resin 21. In order to reduce warpage of the interconnect plate, the metallic component 26B has its material selected according to a particular linear expansion coefficient of the component 26B. The metallic component 26B further functions as a heat sink for the electronic control device 4.

The resin 21 may include an insert-molded metallic collar or the like. This ensures strength of the resin 21 during assembly when the control valve assembly is fixed, and during fixing to a transmission case 9. The metallic component 26A or 26B may also be insert-molded in position that requires strength and/or metal-to-metal contact.

The present embodiment yields the following effects in addition to those of the first embodiment shown and described in FIG. 2. That is to say, unlike the electrohydraulic control module 1A shown in FIG. 2, the electrohydraulic control module 1B of the present embodiment can endure high fluid pressures since the concave portion for use as the oil pathway in the interconnect plate is reinforced by inserting a concave metallic component at the surface side that abuts the separate plate.

The oil pathway in the solenoid 33 can likewise be reinforced by inserting the ring-shaped metallic component 26A in the location of the solenoid 33.

Furthermore, the insertion of the metallic component 26B renders the electronic control device 4 fixable via screws, and warpage of the interconnect plate 2B suppressible.

Next, a configuration of an electrohydraulic control module according to a fourth embodiment of the present invention will be described using FIG. 7.

Figure 7:
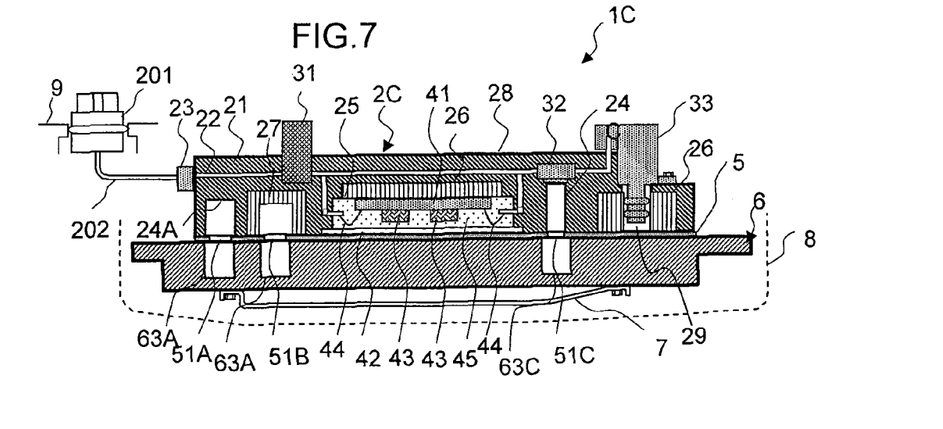
FIG. 7 is an essential-portion sectional view illustrating a configuration of an electrohydraulic control module according to a fourth embodiment of the present invention.

FIG. 7 is an essential-portion sectional view illustrating the configuration of the electrohydraulic control module according to the fourth embodiment of the present invention. In FIG. 7, the same reference numerals or symbols as those used in FIG. 1 denote the same sections.

The electrohydraulic control module 1C according to the present embodiment differs from the electrohydraulic control module 1B of FIG. 6 in oiltight structure of the electronic control device 4. The electronic control devices 4 shown in FIGS. 1, 5 and 6 are transfer-molded with a thermosetting resin such as an epoxy resin. Unlike these control units, the electronic control device of the present embodiment includes a rectangularly parallelepiped metallic component 26B inserted in a concave portion 25 of an interconnect plate 2C, and a multilayered wiring substrate 41 with electronic components 43 facing downward thereon is bonded directly onto the metallic component 26B.

Thin wires 44 are used to electrically connect the multilayered wiring substrate 41 to an interconnect member 22 molded in a state exposed from the resin 21 of the interconnect plate 2C. The thin wires 44 can be formed from a material of aluminum, gold, or copper. The surface section of the interconnect member 22, provided for connecting aluminum thin wires by wire bonding, is partially plated with nickel, silver, or the like, to prevent the surface from being oxidized.

After the connection of the thin wires 44, the concave portion 25 is supplied with a potting material 45, thereby to bond a cover 42. The potting material 45 is cured by heating. The supplying of the potting material 45 is intended to protect the thin wires 44. The potting material 45 is unnecessary if the thin wires 44 are reliable enough. The cover 42 is shaped using the same material as the resin 21 of the interconnect plate 2. The cover 42 may be bonded using an adhesive agent or by laser welding between the resins.

The present embodiment yields the following effects in addition to those of the first embodiment shown and described in FIG. 6. That is to say, since the fluid for hydraulic control is made oiltight by the separate plate, providing a concave portion in a part of the interconnect plate on its surface side that abuts the separate plate, and then mounting the electronic control device in the concave portion helps avoid overprotecting the electronic components and substrate that are likely to corrode under a hot fluid environment. Although the above requires the use of the potting material and the cover, the above does not require excess protect of unit and substrate that are likely to occur corrosion due to high-temperature fluid, like the transfer-molded control unit structure. This effect allows the lead member to be omitted and eliminates a need to use a metallic mold for transfer molding.

Next, a configuration of an electrohydraulic control module according to a fifth embodiment of the present invention will be described using FIG. 8.

Figure 8:
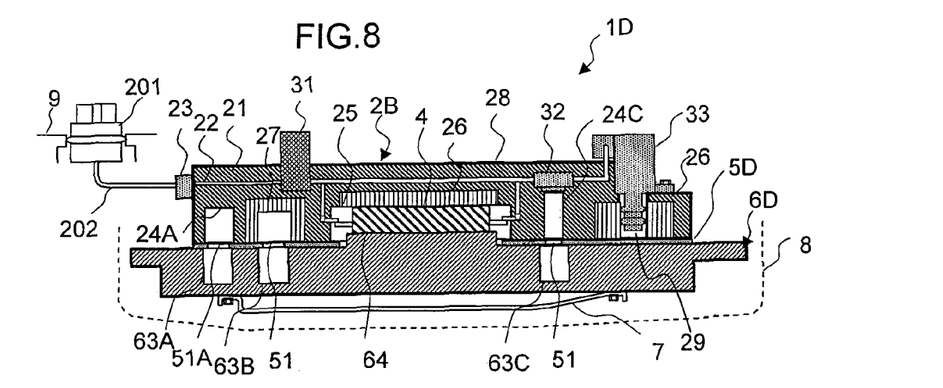
FIG. 8 is an essential-portion sectional view illustrating a configuration of an electrohydraulic control module according to a fifth embodiment of the present invention.

FIG. 8 is an essential-portion sectional view illustrating the configuration of the electrohydraulic control module according to the fifth embodiment of the present invention. In FIG. 8, the same reference numerals or symbols as those used in FIG. 1 denote the same sections.

The electrohydraulic control module 1D according to the present embodiment differs from the electrohydraulic control module 1B of FIG. 6 in that a lower control valve 6D includes a convex portion 64 higher than its surface that abuts a separate plate 5D, at the surface side abutting the separate plate 5D. The separate plate 5D has a hole free from interference with the convex portion 64. Part of an electronic control device 4 and the convex portion 64 of the lower control valve 6D abut upon each other. The part here of the electronic control device 4 can be a sealing resin 47 or a flange 46b of a lead member 46.

The lower control valve 6D is formed from an aluminum material, so heat from the electronic control device 4 can be directly released to a more heat-conductive material without using a separate component.

In conventional structures, heat from an electronic control device cannot be directly released to components of higher heat conductivity, since the heat needs to be conducted to a base member of an interconnect plate before being released to an upper control valve.

The present embodiment yields the following effects in addition to those of the first embodiment shown and described in FIG. 6. That is to say, since the lower control valve includes a convex portion higher than its surface that abuts the separate plate and since a hole free from interference with the convex portion is provided in the separate plate, heat from the electronic control device is directly released, without a plate-like base member being used midway, to an aluminum-diecast control valve of higher heat conductivity. The release of the heat can be accomplished by first forming, in the interconnect plate, a concave portion partially on the surface side that abuts the separate plate, and then abutting upon the convex portion the electronic control device existing after being mounted in the concave portion.

Next, a configuration of an electrohydraulic control module according to a sixth embodiment of the present invention will be described using FIG. 9.

Figure 9:
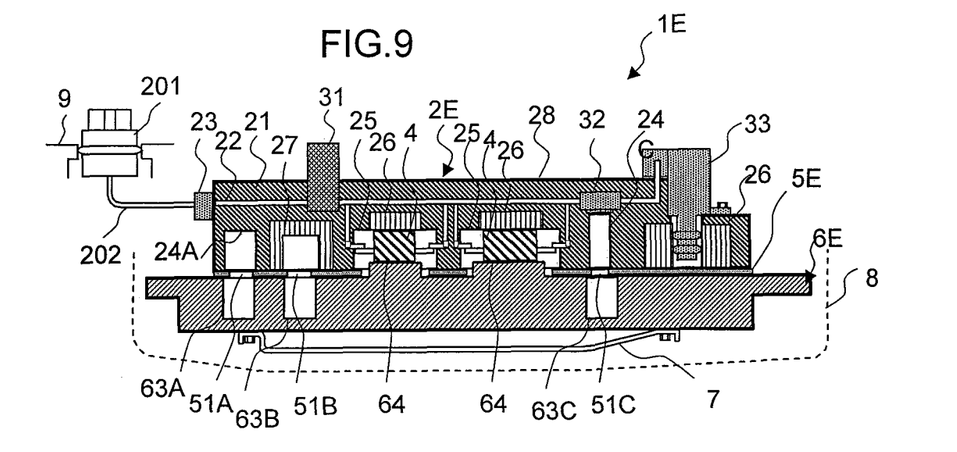
FIG. 9 is an essential-portion sectional view illustrating a configuration of an electrohydraulic control module according to a sixth embodiment of the present invention.

FIG. 9 is an essential-portion sectional view illustrating the configuration of the electrohydraulic control module according to the sixth embodiment of the present invention. In FIG. 9, the same reference numerals or symbols as those used in FIG. 1 denote the same sections.

The electrohydraulic control module 1E according to the present embodiment differs from the electrohydraulic control module 1D of FIG. 8 in that circuit sections of a multilayered wiring substrate 41, an electronic component 43, and the like, are each divided into a plurality of segments to accommodate a plurality of electronic control devices 4 therein. Each of the circuit sections may be divided according to circuit block, or electrical components 31, 32 and 33 may each be divided according to a location of a component to be controlled. Further alternatively, in order to reduce components costs of the multilayered wiring substrate 41, the division may be based upon an optimum number of cavities for forming the multilayered wiring substrate 41.

The electronic control devices 4 increase in number, but decrease in dimensions per unit. For transfer molding with a metallic mold, the dimensional decrease improves productivity of the electronic control devices 4. In addition, thermal stresses due to any differences in linear expansion coefficient between dissimilar materials are reduced, which allows reliability of air tightness and that of oil tightness to be enhanced without causing warpage, peeling-off, and cracking.

The interconnect plate 2 includes a plurality of concave portions 25, and the dimensionally reduced electronic control devices 4 are distributedly arranged in the concave portions 25.

The downsizing of the electronic control devices 4 correspondingly reduces the concave portions 25 dimensionally, thus reducing the restrictions on the layout of oil pathways and electrical components 31, 32 and 33.

The present embodiment yields the following effects in addition to those of the first embodiment shown and described in FIG. 8. That is to say, even if the electronic control device is too large for the module to be able to afford a concave portion of an appropriate mounting size for the electronic control device, a mounting area therefor can be created by providing a plurality of concave portions in the interconnect plate, dividing a circuit block of the electronic control device into segments, and distributedly arranging these segments of the circuit block in the concave portions.

DESCRIPTION OF REFERENCE NUMERALS

1 . . . Electrohydraulic control module
2 . . . Interconnect plate
21 . . . Resin
22 . . . Interconnect member
23 . . . Connector
24A, 24B, 24C, 25 . . . Concave portions
26A, 26B . . . Metallic components
27 . . . Concave metallic component
201 . . . External connector
202 . . . Connecting member
31 . . . Sensor
32 . . . Switch
33 . . . Solenoid
4 . . . Electronic control device
41 . . . Multilayered wiring substrate
42 . . . Cover
43 . . . Electronic component
44 . . . Thin wire
45 . . . Potting material
46a . . . . Lead terminal
46b . . . Flange
47 . . . Sealing resin
48 . . . Adhesive agent
5 . . . Separate plate
51A, 51B, 51C . . . Communication portions
6 . . . Lower control valve
63A, 63B, 63C . . . Concave portions (Oil pathways)
64 . . . Convex portion
7 . . . Oil strainer
8 . . . Oil pan
9 . . . Transmission case

The invention claimed is:

1. An electrohydraulic control module comprising:
a control valve for hydraulically controlling a transmission, the control valve being provided with an oil pathway including a first concave portion;
an electronic control device that controls a component to be controlled by the control valve; and
an electrical interconnect plate including an interconnect member, the interconnect member electrically connecting the electronic control device and the component to be controlled;
wherein the electrohydraulic control module includes a separate plate disposed between the interconnect plate and the control valve;
the interconnect plate includes a second concave portion at a part of its surface side that abuts the separate plate;
the electronic control device is mounted in the second concave portion of the interconnect plate, the interconnect plate is kept oiltight by the separate plate, and the electronic control device is located between the interconnect plate and the separate plate,
the control valve includes a convex portion formed on its surface side that abuts the separate plate, the convex portion being higher than the surface that abuts the separate plate;
the separate plate includes a hole free from interference with the convex portion; and
the convex portion of the control valve extends through the hole in the separate plate and comes into contact with part of the electronic control device.

2. The electrohydraulic control module according to claim 1, further comprising:
a metallic component that is insert-molded in the second concave portion of the interconnect plate.

3. The electrohydraulic control module according to claim 1, wherein:
the second concave portion of the interconnect plate is provided in a plurality of places; and
a circuit block for the electronic control device is divided into segments such that circuit elements of the circuit block are distributedly arranged in the concave portions.

* * * * *